Patented May 15, 1951

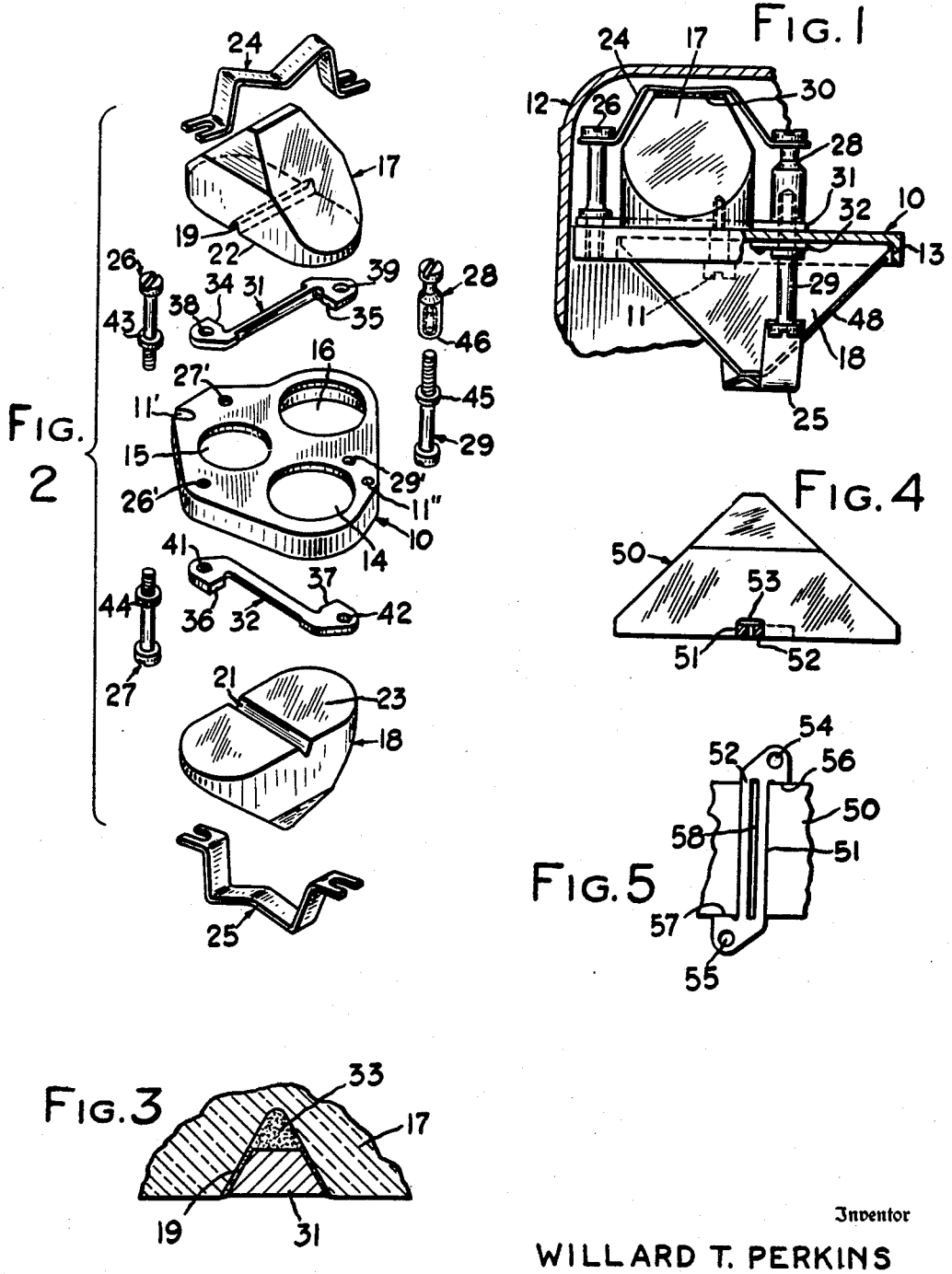

2,553,329

UNITED STATES PATENT OFFICE 2,553,329

MEANS FOR MOUNTING PRISMS

Willard T. Perkins, Irondequoit, N. Y., assignor to Bausch & Lomb Optical Company, Rochester, N. Y., a corporation of New York Application April 14, 1948, Serial No. 20,861

1 Claim. (Cl. 88—33)

This invention relates to prismatic telescopes and the like and more particularly it relates to the means for mounting the prismatic members thereof in the instrument.

For the comfort and convenience of the user of such instruments as prismatic binoculars and the like which have a centrally located focusing knob, it is important that the finger reach around the outer surface of the prism housings to the focusing knob be as short as possible. Thereby a reliable turning force may be applied to the focusing knob by the finger tips while the instrument is held in viewing position. In view of this requirement, the design of the interior supporting and locating means for the prismatic system must be as compact as optical and mechanical considerations permit, particularly in the larger sizes of binoculars, without sacrificing the strength, stability, or adjustability of the prism mounting.

It is an object of this invention to provide a prism holding and locating device which is compact in form yet efficient in operation.

It is a further object to provide prism mounting means wherein the elements may be easily adjusted and reliably held in alignment.

It is another object to provide such a device which utilizes the anti-reflection grooves, usually found in the prisms of binoculars and the like, for locating the prisms.

Further objects and advantages will become apparent to those skilled in this art by reference to the following description and accompanying drawing in which:

Fig. 1 is a side elevation, partly in section, of a preferred embodiment of this invention, Fig. 2 is an exploded view showing the parts of the prism holding means, Fig. 3 is a fragmentary cross section of one of the anti-reflection grooves in a prism, Fig. 4 is a view, partly in section, of a modification of the prism locating means, and Fig. 5 is a plan view of the modified prism holding bar.

As shown in Fig. 1 of the drawing, a support plate 10 is rigidly held by any suitable means such as the screws 11 in a prism housing 12 of a binocular or like instrument, not shown. The plate 10 is preferably provided with a recess 13 on its under side and has three large apertures 14, 15 and 16 located substantially concentrically with the optical axis of the instrument. A pair of right angled isosceles Porro prisms 17 and 18, having anti-reflection grooves 19 and 21 therein across the midsection of their hypotenuse faces 22 and 23, are mounted on opposite sides of plate 10 covering the apertures 14, 15, and 15, 16, respectively.

According to this invention, the prisms 17 and 18 are individually held and located by separate means. The holding means comprise the holding springs 24 and 25 which are anchored under tension at their ends under heads on the screw studs 26, 27, 28, and 29, and bear respectively against the apex of the prisms 17 and 18 so as to firmly press the prisms against the plate. Screw studs 26, 27 are threaded into holes 26' and 27' respectively in plate 10 whereas screw stud 29 extends through a hole 29' in the plate and is threaded into the stud 28. A cork pad 30 is placed between the apex of prism 17 and the spring 24.

For locating the prisms 17 and 18 on the opposite surfaces of the plate 10, the flat locating bars 31 and 32 are provided which are identical in form and are held, respectively, within the anti-reflection grooves 19 and 21. In the preferred form of the invention, the grooves 19 and 21 are substantially V-shaped and the locating bars 31 and 32 are correspondingly shaped and are held in the grooves by a suitable adhesive 33 as shown in Figure 3. In order to assure that the prisms 17 and 18 rest solely on their hypotenuse faces, the corresponding locating bars 31 and 32 do not protrude beyond the planes in which these faces lie. At each end, the locating bars 31 and 32 are extended beyond their respective prisms to form offset portions having clearance holes 38, 39 and 41, 42 respectively therethrough which loosely fit the screw studs 26—29 so as to permit small aligning adjustments of the prisms 17 and 18 during assembly. In order to improve the grip of the locating bars 31 and 32 on their respective prisms, fixedly spaced lateral shoulders 34, 35 and 36, 37 respectively extending along the opposite parallel sides of the prisms are provided on said offset portions of bars 31, 32 between which each prism is closely confined. Anchoring means for detachably securing the offset portions of the bars 31 and 32 to the plate 10 are provided by the radial flanges 43, 44, and 45 on the screw studs 26, 27, and 28, respectively, and the shoulder 46 on the screw stud 29 under which the offset portions are clamped when the screw studs are tightened. An opaque light shield 48, covering the reflecting faces and intervening apex of prism 18, is held in assembled position under the holding spring 25 as shown in Fig. 1.

In assembling the prisms 17 and 18, locating bars 31 and 32 are fitted and cemented into the anti-reflection grooves 19 and 21 respectively, using an adhesive 33 such as the commercial product "Pliobond," which adheres well to both glass and metal. The prism surface 22 is then placed over the apertures 15 and 16 on the upper surface of the plate 10 and tentatively secured thereto by introducing the screw stud 26 into the hole 38 and screwing it into the hole 26' of the plate. Likewise, the prism surface 23 is placed over the apertures 14 and 15 and tentatively secured to the under surface of the plate by introducing the screw stud 27 through the hole 41 in locating bar 32 and screwing it into the hole 27' of the plate. The unsecured ends of each of the bars 31 and 32 are then loosely clamped to the plate 10 by passing the screw stud 29 successively through the hole 42 in bar 32, hole 29' in plate 10, and hole 39 in bar 31 and screwing it into the companion stud 28. The light shield 48 is next positioned on the prism 18 and the ends of the holding springs 24 and 25 are placed under tension beneath the heads of the screw studs 26—29 to firmly hold the prisms against plate 10. With the screw studs 26—29 bearing lightly on the bars 31 and 32, the prisms are moved into precise alignment with the optical system of the instrument and subsequently these bars 31 and 32 are anchored to the plate 10 by tightening the stud flanges 43—45 and shoulder 46 against the bars. Assembly of the prism system is completed by setting the plate 10 into the housing 12 and fastening it thereto by the screws 11 which engage in the slot 11' and hole 11'' in the plate.

In Figs. 4 and 5 of the drawing there is represented a second form of prism locating means in which a prism 50 is provided with a substantially parallel sided anti-reflection groove 51. Within the groove 51, a flat locating bar 52 is fitted so as to substantially conform to the parallel sides of the groove. The bar is spaced from the top of the groove as shown at 53 so that the prism 50 cannot rest upon the bar. The ends of the locating bar 52 have offset portions which are pierced by clearance holes 54 and 55 and also have the fixedly spaced lateral shoulders 56 and 57 similar in purpose and in form to the bars 31 and 32 of Fig. 2. The locating bar 52 is slotted as at 58 so that the sides of the bar frictionally engage the walls of the groove to retain the bar in the groove.

Aside from the method of assembling the locating bar in the parallel-sided groove, the assembly and adjustment of this form of the invention is substantially the same as in the first embodiment.

It will be understood that the locating bars 31, 32, and 52 serve solely as locating means for positioning their associated prisms on the surface of the mounting plate 10, and are not intended to serve in any way as a support for the prisms. Both forms of the invention above described embody a very compact, reliable and sturdy means by which the prisms 17 and 18 may be individually adjusted and locked in aligned position by utilizing their anti-reflection grooves in accordance with the objects of this invention. Although but certain forms of this invention have been shown and described in detail, it will be understood that other forms are possible and that changes may be made in the arrangement and shape of the parts without departing from the spirit of the invention as defined in the appended claim.

I claim:

In a prism mounting for an optical instrument, the combination of a plate having a continuous flat surface and a plurality of apertures therein, a prism having a hypotenuse face and a groove extending across said face, a locating bar adhesively secured to the prism within the groove, said bar having apertured projections extending beyond the sides of the prism, said prism having its hypotenuse face in contact with said surface of the plate, said projections overlying said surface of the plate, and screws passing through oversize holes in said projections and having portions holding the projections in clamping relation to the plate whereby the prism may be adjustably located on said surface relative to the apertures and secured in adjusted position on the plate, and additional means engaging the prism and holding the latter against the plate.

WILLARD T. PERKINS.

REFERENCES CITED

The following references are of record in the file of this patent:

UNITED STATES PATENTS

| Number | Name | Date |
|---|---|---|
| 714,340 | Warner et al. | Nov. 25, 1902 |
| 1,959,538 | Langenhagen et al. | May 22, 1934 |
| 2,399,909 | Boughton et al. | May 7, 1946 |
| 2,430,779 | Peck et al. | Nov. 11, 1947 |
| 2,437,947 | Falkoff | Mar. 16, 1948 |